(12) United States Patent
Cosby et al.

(10) Patent No.: US 10,812,588 B2
(45) Date of Patent: Oct. 20, 2020

(54) STORAGE PERFORMANCE BASED ON DATA PLACEMENT

(71) Applicant: LENOVO Enterprise Solutions (Singapore) PTE. LTD., New Tech Park (SG)

(72) Inventors: David W. Cosby, Raleigh, NC (US); Jian Li, Chapel Hill, NC (US); Shyam Sareen, Bedford, MA (US); William G. Holland, Cary, NC (US); Michael N. Condict, Hurdill Mills, NC (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 943 days.

(21) Appl. No.: 14/995,073

(22) Filed: Jan. 13, 2016

(65) Prior Publication Data

US 2017/0199877 A1    Jul. 13, 2017

(51) Int. Cl.
  *G06F 7/00* (2006.01)
  *H04L 29/08* (2006.01)

(52) U.S. Cl.
  CPC ................ *H04L 67/1097* (2013.01)

(58) Field of Classification Search
  CPC .................................................. H04L 67/1097
  USPC ....................................................... 707/748
  See application file for complete search history.

(56) References Cited

U.S. PATENT DOCUMENTS

| | | | |
|---|---|---|---|
| 7,711,980 B1 | 5/2010 | Scarpello, Jr. et al. | |
| 9,818,136 B1 | 11/2017 | Hoffberg | |
| 2003/0154305 A1* | 8/2003 | Bethmangalkar | H04L 67/1034 709/245 |
| 2004/0172530 A1* | 9/2004 | Birk | G06F 21/64 713/155 |
| 2006/0190602 A1 | 8/2006 | Canali et al. | |
| 2006/0235873 A1* | 10/2006 | Thomas | G06F 16/9535 |
| 2007/0043860 A1 | 2/2007 | Pabari | |
| 2008/0016198 A1 | 1/2008 | Johnston-Watt et al. | |
| 2008/0120129 A1* | 5/2008 | Seubert | G06Q 10/10 705/35 |
| 2009/0119396 A1 | 5/2009 | Kanda | |
| 2010/0322088 A1 | 12/2010 | Muthiah | |
| 2011/0010518 A1 | 1/2011 | Kavuri | |

(Continued)

OTHER PUBLICATIONS

U.S. Appl. No. 14/992,395, filed Jan. 11, 2016, Office Action dated Jan. 18, 2018.

(Continued)

*Primary Examiner* — Eliyah S. Harper

(74) *Attorney, Agent, or Firm* — Kunzler Bean & Adamson; Bruce R. Needham

(57) ABSTRACT

Apparatuses, systems, methods, and program products are disclosed for improved storage performance based on data placement. An identifier module generates a plurality of unique identifiers. Each of the unique identifiers is associated with a storage node of a storage cluster. A rank module ranks each of the plurality of unique identifiers in response to a received data item. The ranking of a unique identifier is based on one or more characteristics associated with the received data item. A storage module selects a unique identifier of the plurality of unique identifiers with a best ranking and stores the data item on a storage node associated with the selected unique identifier.

20 Claims, 5 Drawing Sheets

(56) References Cited

U.S. PATENT DOCUMENTS

| | | |
|---|---|---|
| 2012/0166630 A1 | 6/2012 | Cho et al. |
| 2012/0210382 A1 | 8/2012 | Walker et al. |
| 2012/0254111 A1 | 10/2012 | Carmichael |
| 2012/0317276 A1 | 12/2012 | Muniraju |
| 2013/0007254 A1 | 1/2013 | Fries |
| 2013/0024650 A1* | 1/2013 | Ambat ............... G06F 3/061 711/209 |
| 2013/0304903 A1 | 11/2013 | Mick et al. |
| 2014/0040426 A1* | 2/2014 | Glaser ............ H04L 67/1095 709/217 |
| 2014/0059207 A1 | 2/2014 | Gulati et al. |
| 2014/0181834 A1* | 6/2014 | Lim .................. G06F 9/5088 718/105 |
| 2014/0304756 A1* | 10/2014 | Fletcher ............. H04L 65/1066 725/115 |
| 2014/0359043 A1* | 12/2014 | Gao ................... G06F 15/167 709/212 |
| 2015/0092561 A1 | 4/2015 | Sigoure |
| 2015/0096004 A1* | 4/2015 | Zhou .................. H04L 9/3231 726/7 |
| 2015/0220502 A1* | 8/2015 | Tully ............... G06F 11/3438 715/242 |
| 2015/0222493 A1* | 8/2015 | Tully ............... G06F 3/0485 715/234 |
| 2015/0222693 A1* | 8/2015 | Tully ............... G06F 11/3438 709/203 |
| 2015/0312335 A1 | 10/2015 | Ying |
| 2015/0381453 A1 | 12/2015 | Skjolsvold et al. |
| 2016/0170668 A1 | 6/2016 | Mehra |
| 2016/0330245 A1 | 11/2016 | Bell |
| 2016/0352866 A1 | 12/2016 | Gupta et al. |
| 2017/0193136 A1 | 7/2017 | Prasad |
| 2017/0201423 A1 | 7/2017 | Crowe et al. |
| 2017/0315836 A1 | 11/2017 | Langer et al. |

OTHER PUBLICATIONS

U.S. Appl. No. 14/992,395, Notice of Allowance dated Nov. 30, 2018.
Sage A. Weil et al., Crush: Controlled, Scalable, Decentralized Placement of Replicated Data, University of California, Santa Cruz, Nov. 2006, Tampa, Florida, USA, http://ceph.com/papers/weil-crush-sc06.pdf, Last visited Jan. 13, 2016.
Andrew Lazarev, Improving Data Processing Performance with Hadoop Data Locality, Mirantis, Feb. 28, 2014, https://www.mirantis.com/blog/improving-data-processing-performance-hadoop-data-locality/, Last visited Jan. 13, 2016.
Robert Nystrom, Game Programming Patterns, Genever, Benning, 2014, Section 6, Chapter 17 "Data Locality", http://gameprogrammingpatterns.com/contents.html, Last visited Jan. 13, 2016.
James Peter Giannoules, ProxStor: Flexible Scalable Proximity Data Storage & Analysis, University of Texas at Austin, Dec. 2014, https://repositories.lib.utexas.edu/bitstream/handle/2152/28536/GIANNOULES-MASTERSREPORT-2014.pdf?sequence=1&isAllowed=y, Last visited Jan. 13, 2016.
U.S. Appl. No. 14/992,395, Office Action dated Aug. 10, 2018.

* cited by examiner

STORAGE PERFORMANCE BASED ON DATA PLACEMENT

FIELD

The subject matter disclosed herein relates to networked computer systems and more particularly relates to data management in a storage cluster.

BACKGROUND

Distributed storage systems (e.g., storage clusters) may include thousands of individual storage servers (e.g., storage nodes). Such systems may assign newly created data to storage nodes using a pseudo-randomized approach to provide capacity and load balancing. Newly created data items may be assigned to a particular storage node using the pseudo-random approach. However, by using only a pseudo-random approach, placement of data items on storage nodes within a storage cluster may be completely determined by the randomization, without considering other external factors.

BRIEF SUMMARY

An apparatus for improved storage performance based on data placement is disclosed. A method and computer program product also perform the functions of the apparatus. An apparatus, in one embodiment, includes an identifier module that generates a plurality of unique identifiers. Each of the unique identifiers may be associated with a storage node of a storage cluster.

An apparatus, in another embodiment, includes a rank module that ranks each of the plurality of unique identifiers in response to a received data item. The ranking of a unique identifier may be based on one or more characteristics associated with the received data item. An apparatus, in some embodiments, includes a storage module that selects a unique identifier of the plurality of unique identifiers with a best ranking and stores the data item on a storage node associated with the selected unique identifier.

In one embodiment, a size of a pool of unique identifiers that are generated is based on one or more of a number of storage nodes in the storage cluster and a data placement pattern for the storage cluster. In some embodiments, a new unique identifier is generated and added to the plurality of unique identifiers after the selected unique identifier is used. In a further embodiment, a character string representing the selected unique identifier is used as at least a portion of a name assigned to the received data item when the received data item is stored on the storage node.

In one embodiment, the received data item is associated with an application executing on a client device connected to the storage cluster. The client device may include a storage node of the storage cluster. In a further embodiment, a unique identifier associated with the client device executing the application is assigned the best ranking such that the received data item is stored on the client device. In another embodiment, the apparatus includes a network module that determines one or more network characteristics associated with the client device and one or more storage nodes of the storage cluster.

In some embodiments, each of the plurality of unique identifiers is ranked based on the one or more network characteristics. The one or more network characteristics may include one or more of a number of intermediate network devices between the client device and a storage node, a network distance between the client device and a storage node, a physical location of the client device and a physical location of a storage node, an amount of network traffic between the client device and a storage node, an amount of network latency between the client device and a storage node, a number of alternate network paths between the client device and a storage node, internet protocol ("IP") addresses of the client device and a storage node, and media access controller ("MAC") addresses of the client device and a storage node.

In one embodiment, the identifier module generates the plurality of unique identifiers at system startup before any data items are generated in the storage cluster. In a further embodiment, the storage node is one of a plurality of virtual storage nodes of the storage cluster such that one or more of the plurality of unique identifiers is associated with a virtual storage node. In some embodiments, each of the plurality of unique identifiers associated with a virtual storage node maintains its association to a virtual storage node when a virtual storage node is migrated to a different physical device.

A method, in one embodiment, includes generating, by use of a processor, a plurality of unique identifiers. In some embodiments, each unique identifier of the plurality of unique identifiers is associated with a storage node of a storage cluster. In a further embodiment, a method includes ranking each of the plurality of unique identifiers in response to a received data item. In some embodiments, the ranking of a unique identifier is based on one or more characteristics associated with the received data item. In certain embodiments, a method includes selecting a unique identifier of the plurality of unique identifiers with a best ranking and storing the data item on a storage node associated with the selected unique identifier.

In one embodiment, a size of a pool of unique identifiers that are generated is based on one or more of a number of storage nodes in the storage cluster and a data placement pattern for the storage cluster. In a further embodiment, a character string representing the selected unique identifier is used as at least a portion of a name assigned to the received data item when the received data item is stored on the storage node. In some embodiments, the received data item is associated with an application executing on a client device connected to the storage cluster. The client device may be a storage node of the storage cluster.

In some embodiments, a unique identifier associated with the client device executing the application associated with the received data item is assigned the best ranking such that the received data item is stored on the client device. In some embodiments, the method includes determining one or more network characteristics associated with the client device and one or more characteristics of the storage cluster. In a further embodiment, each of the plurality of unique identifiers is ranked based on the one or more network characteristics.

In one embodiment, the method includes generating the plurality of unique identifiers at system startup before any data items are generated in the storage cluster. In various embodiments, the storage node is one of a plurality of virtual storage nodes of the storage cluster such that one or more of the plurality of unique identifiers is associated with a virtual storage node.

A program product, in one embodiment, includes a computer readable storage medium that stores code executable by a processor. The executable code, in some embodiments, includes code to perform generating a plurality of unique identifiers. In one embodiment, each unique identifier of the plurality of unique identifiers may be associated with a storage node of a storage cluster.

The executable code, in various embodiments, includes code to perform ranking each of the plurality of unique identifiers in response to a received data item. The ranking of a unique identifier may be based on one or more characteristics associated with the received data item. The executable code, in one embodiment, includes code to perform selecting a unique identifier of the plurality of unique identifiers with a best ranking and storing the data item on a storage node associated with the selected unique identifier.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
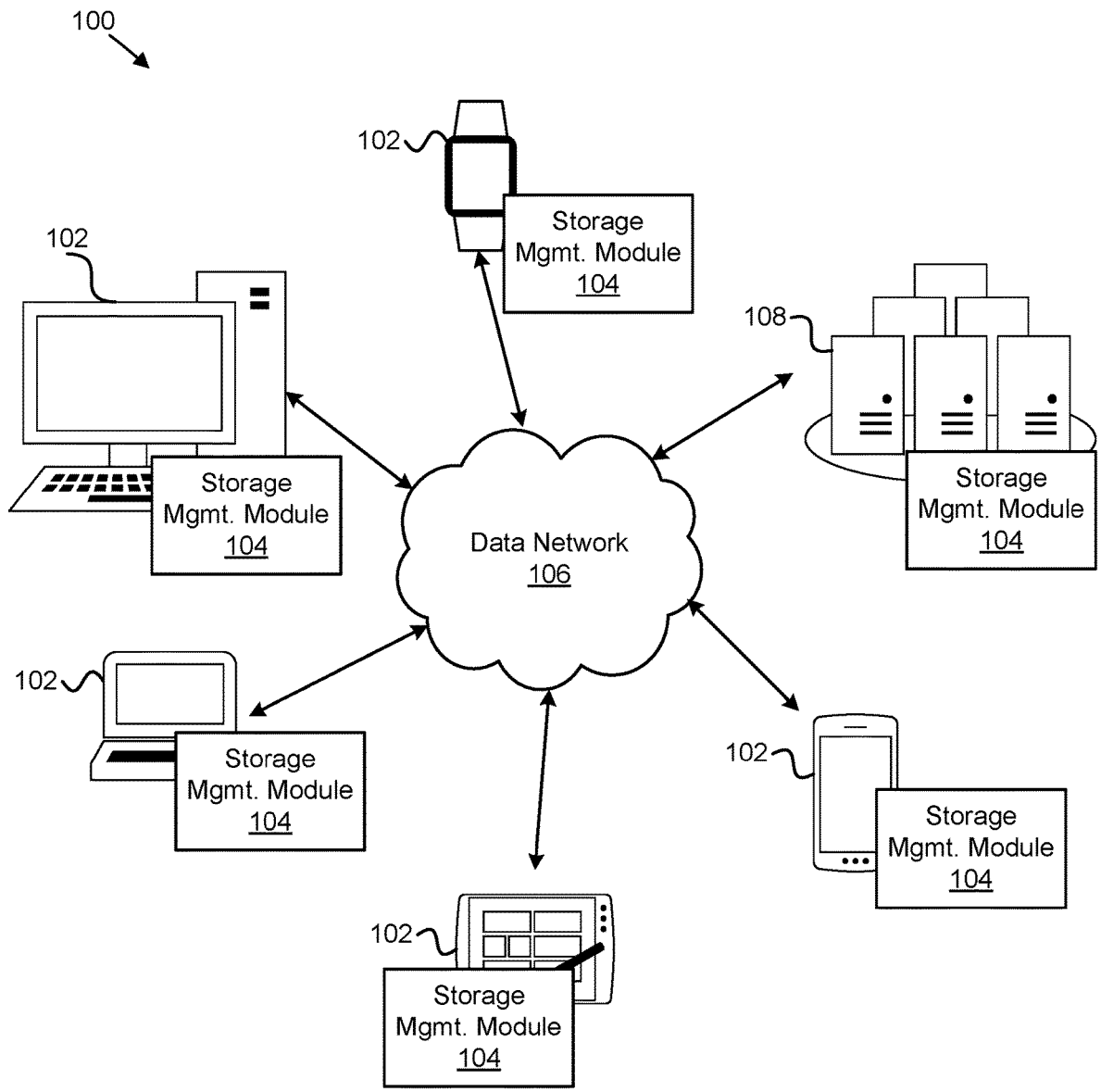
FIG. 1 is a schematic block diagram illustrating one embodiment of a system for improved storage performance based on data placement.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for improved storage performance based on data placement. In one embodiment, the system 100 includes one or more information handling devices 102, one or more storage management modules 104, one or more data networks 106, and one or more servers 108. In certain embodiments, even though a specific number of information handling devices 102, storage management modules 104, data networks 106, and servers 108 are depicted in FIG. 1, one of skill in the art will recognize, in light of this disclosure, that any number of information handling devices 102, storage management modules 104, data networks 106, and servers 108 may be included in the system 100 for improved storage performance based on data placement.

In one embodiment, the system 100 includes one or more information handling devices 102. The information handling devices 102 may include one or more of a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device including a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more servers 108 via a data network 106, described below. The information handling devices 102, in a further embodiment, are capable of executing various programs, program code, applications, instructions, functions, or the like, which may access, store, download, upload, and/or the like data located on one or more servers 108.

In one embodiment, the storage management module 104 is configured to place data in a networked computing system, e.g., a computing storage cluster, at a location closer in proximity to a client associated with the data, e.g., a client that sends a request to store, access, read, delete, or the like, the data, in order to decrease network latency and alleviate storage traffic bottlenecks in the data network 106. In one embodiment, the storage management module 104 is configured to generate a plurality of unique identifiers and associate each identifier with a storage node of a storage cluster. In some embodiments, the storage management module 104 is configured to rank each of the plurality of unique identifiers in response to receiving a data item. A unique identifier's ranking may be based on one or more characteristics of the data item. In a further embodiment, the storage management module 104 selects a unique identifier of a plurality of unique identifiers with a best ranking and stores the data item on a storage node associated with the selected unique identifier.

The storage management module 104, in certain embodiments, places data, on average, in a storage cluster according to a deterministic pseudo-random distribution over time, which balances the storage cluster's load and capacity. The storage management module 104, in one embodiment, determines which storage node of a storage cluster to place the data based on network characteristics of the storage cluster, a network topology of the storage cluster, physical locations of nodes in the storage cluster, and/or the like. Thus, the storage management module 104, in certain embodiments, may utilize existing randomization algorithms for data placement, while also accounting for various network characteristics of the storage cluster.

In various embodiments, the storage management module 104 may be embodied as a hardware appliance that can be installed or deployed on an information handling device 102, on a server 108, or elsewhere on the data network 106. In certain embodiments, the storage management module 104 may include a hardware device such as a secure hardware dongle or other hardware appliance device (e.g., a set-top box, a network appliance, or the like) that attaches to a device such as a laptop computer, a server 108, a tablet computer, a smart phone, or the like, either by a wired connection (e.g., a USB connection) or a wireless connection (e.g., Bluetooth®, Wi-Fi®, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the storage management module 104 may include a power interface, a wired and/or wireless network interface, a graphical interface that attaches to a display, and/or a semiconductor integrated circuit device as described below, configured to perform the functions described herein with regard to the storage management module 104.

The storage management module 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the storage management module 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the storage management module 104.

The semiconductor integrated circuit device or other hardware appliance of the storage management module 104, in certain embodiments, includes and/or is communicatively coupled to one or more volatile memory media, which may include but is not limited to: random access memory ("RAM"), dynamic RAM ("DRAM"), cache, or the like. In one embodiment, the semiconductor integrated circuit device or other hardware appliance of the storage management module 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. In some embodiments, the one or more servers 108 may be located on an organization's premises, in a data center, in the cloud, and/or the like. The one or more servers 108 may be accessed remotely over a data network 106 like the Internet, or locally over a data network 106 like an intranet.

The one or more servers 108 may be communicatively coupled (e.g., networked) over a data network 106 in a cluster storage system. As used herein, a cluster storage system is a storage system that uses multiple interconnected servers 108 (e.g., storage nodes) to manage the storage, organization, access, and/or the like of data used by client devices associated with the cluster storage system. A storage cluster may use a clustered file system to organize data and make the data accessible to client devices. The clustered file system may be shared among multiple servers 108 (e.g., storage nodes in the cluster) by being mounted simultaneously on each server 108. The cluster storage system may be embodied as a hyper-converged cluster, a shared-disk file system, a distributed file system, a network-attached storage system, and/or the like. The cluster storage system may utilize a storage area network ("SAN") to provide access to data stored in the cluster.

Figure 2:
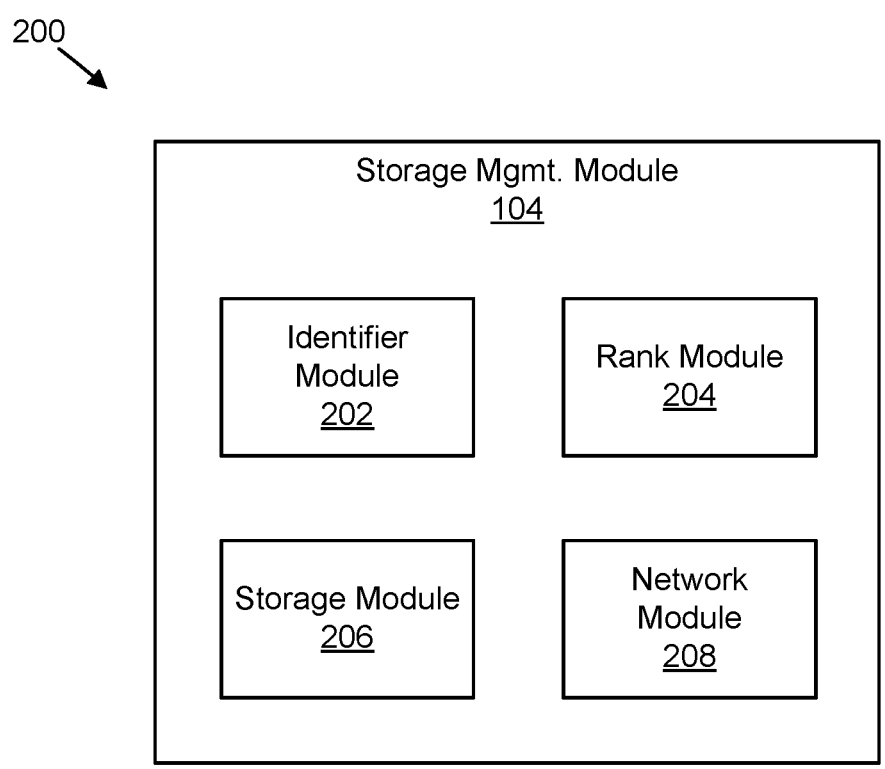
FIG. 2 is a schematic block diagram illustrating one embodiment of a module for improved storage performance based on data placement.

FIG. 2 depicts one embodiment of a module 200 for improved storage performance based on data placement. The module 200 may include an embodiment of a storage management module 104. The storage management module 104 may include one or more of an identifier module 202, a rank module 204, a storage module 206, and optionally a network module 208, which are described in more detail below.

The identifier module 202, in one embodiment, is configured to generate a plurality of unique identifiers (e.g., globally unique identifiers ("GUID"), universally unique identifiers ("UUID"), etc.). The identifier module 202 may place the plurality of generated unique identifiers in a pool that the storage module 206 can access to select a unique identifier for a data element. The pool may have a predetermined size, which determines how many unique identifiers the identifier module 202 may create (e.g., the pool of unique identifiers may have 10's, 100's, 1,000's, 10,000's, etc. of unique identifiers). In certain embodiments, a unique identifier is represented by a character string (e.g., a string of ASCII characters (letters, numbers, symbols), or the like), a random number (e.g., a random int, a long int, a floating point value, and/or the like), and/or the like.

In certain embodiments, the identifier module 202 associates each unique identifier of the plurality of unique identifiers with a storage node of the storage cluster. As described above, a storage node may include a server 108, or other computing device, communicatively coupled to another server 108, or other computing device, in a storage cluster system, and may store data accessible by one or more applications connected to the storage cluster. In one embodiment, the identifier module 202 determines how many storage nodes are in the storage cluster, identifies each of the storage nodes, and assigns each of the generated unique identifiers to a storage node.

In some embodiments, the identifier module 202 hashes the identifier or name for the unique identifier using a predetermined hash function to determine which of the storage nodes to assign to the unique identifier. For example, the identifier module 202 may hash the character string identifying the unique identifier using a hash function that maps character strings to a certain value based on the number of the storage nodes in the storage cluster.

In certain embodiments, the identifier module 202 randomly, pseudo-randomly, deterministically, and/or the like, assigns a unique identifier to a storage node. For instance, if the identifier module 202 generates ten unique identifiers, and there are five storage nodes in the cluster, the identifier module 202 may randomly assign each unique identifier to one of the five storage nodes. As will be described in more detail below, the storage module 206 may select and associate a unique identifier with a data item and store the data item on a storage node associated with the unique identifier. By randomizing the assignment of storage nodes to unique identifiers, load and capacity balancing can be achieved in the storage cluster over time, on average, as data items are stored in the storage cluster according to the storage node associated with a unique identifier.

In one embodiment, the more unique identifiers that the identifier module 202 generates in the pool of unique identifiers, the probability of selecting a unique identifier associated with a storage node that provides an optimal placement for a data item is higher in the short term. Such an embodiment, however, may cause a load or capacity imbalance in the storage cluster. For example, assuming the "best" storage node for data created by an application executing on client device A is storage node B instead of one of storage nodes C-N, if the identifier module 202 creates a large number of unique identifiers, the probability of selecting a unique identifier associated with storage node B is higher than if the identifier module 202 creates a lower number of unique identifiers because there may be a higher likelihood of unique identifiers being randomly assigned to storage node B, and therefore more data items associated with client device A may be stored on storage node B instead of being evenly distributed across the other storage nodes C-N in the storage cluster in the short term. Over time, however, the distribution of data in the storage cluster may achieve a more even distribution as the unique identifiers for storage node B are used and the number of available unique identifiers for storage node B decreases.

In one embodiment, the identifier module 202 generates and maintains a pool of unique identifiers that has a size based on a number of storage nodes in the storage cluster. In certain embodiments, the identifier module 202 determines how many storage nodes are available in the storage cluster and generates/maintains a pool of unique identifiers that has a size determined as a function of the determined number of storage nodes. For example, if there are ten storage nodes in the cluster, the identifier module 202 may create and maintain a pool of unique identifiers of a size determined as a multiple of the ten storage nodes (e.g., two times, three times, etc.), according to a randomization algorithm that incorporates the number of storage nodes in the storage cluster, and/or the like. In certain embodiments, the size of the pool of unique identifiers generated by the identifier module 202 corresponds to the number of storage nodes in the storage cluster, e.g., ten unique identifiers may be created for ten storage nodes.

In a further embodiment, the identifier module 202 generates and maintains a pool of unique identifiers that has a size based on a data placement pattern for the storage cluster. In one embodiment, the identifier module 202 generates/ maintains a pool of unique identifiers that has a size determined according to a load balancing algorithm, a capacity balancing algorithm, and/or the like. For example, the identifier module 202 may generate and maintain a pool of unique identifiers of a size determined based on an algorithm for placing data on the storage nodes such that the balance of the data placement does not exceed a balance threshold. In other words, the pool size may attempt to ensure that the number of data items stored on each storage node does not vary by a predetermined threshold. In certain embodiments, a larger pool of unique identifiers may provide a more balanced data placement in the long term, but at the expense of data placement being slightly less random in the short term.

Similarly, the identifier module 202 may generate and maintain a pool of unique identifiers of a size determined based on an algorithm for placing data on the storage nodes that maintains a capacity threshold on each storage device. For example, the identifier module 202 may generate and maintain a pool of unique identifiers of a determined size such that the storage capacity of the storage nodes is relatively even between each of the nodes, meaning that one node does not store a substantially larger amount of data than another storage node in the storage cluster. In one embodiment, the identifier module 202 generates and maintains a number of unique identifiers based on input received from a user, such as a system administrator, who may specify how many unique identifiers to create and maintain in the pool of unique identifiers.

In one embodiment, the identifier module 202 generates the plurality of unique identifiers at system startup before any data items are generated in the storage cluster. For example, the identifier module 202 may be triggered to generate the pool of unique identifiers at startup, after an operating system is loaded, after a cluster of storage nodes is configured, in response to a command to execute an application that stores data items in the storage cluster, and/or the like.

In one embodiment, a storage node is one of a plurality of virtual storage nodes (also known as containers or placement groups) of the storage cluster such that one or more of the plurality of unique identifiers is associated with a virtual storage node. In certain embodiments, a large number of virtual storage nodes are mapped to a smaller number of physical storage server nodes. In a further embodiment, the identifier module 202 pseudo-randomly associates each of the plurality of unique identifiers with a virtual storage node, instead of a physical storage node, even though each data item is still located on a physical storage node. In some embodiments, the data item may be located in the storage cluster by using the unique identifier to determine the virtual storage node that the data item is associated with, and then using a mapping of virtual storage nodes to physical storage nodes to determine which physical storage node is storing the data for the virtual storage node.

In one embodiment, the identifier module 202 maintains a unique identifier's association to a virtual storage node when a virtual storage node is migrated to a different physical device. In this manner, virtual storage nodes, and the data items that are associated with the virtual storage nodes, may be moved from one physical storage node to another in order to maintain balance when storage nodes are added to the storage cluster and/or to allow a physical node to be removed from the storage cluster (e.g., if a physical storage device fails).

In one embodiment, the rank module 204 is configured to rank each of the plurality of unique identifiers in response to a received data item. For instance, when a data item is received in the storage cluster, the rank module 204 may iterate through each of the unique identifiers in the pool of unique identifiers and assign a rank value, a weight, a factor, or the like to each value. The rank module 204 may assign a rank to each of the unique identifiers based on characteristics associated with the data item, such as characteristics of the data (e.g., the size of the file, the type of the file, etc.), network characteristics (e.g., network traffic, bandwidth, latency, device locations, etc.), and/or the like, as explained below.

In one embodiment, the rank module 204 assigns a higher rank to unique identifiers that are associated with storage nodes that are in closer proximity to the client device that created the data item than other storage nodes. Other criteria may be used to determine a rank of a unique identifier. For example, different network characteristics, as determined by the network module 208 described below, may be used to determine the favorability of a storage node associated with a unique identifier and assign a rank to the unique identifier.

For example, a unique identifier for a storage node that has a minimum number of "hops" or devices between it and the client device may be assigned a high rank; a unique identifier for a storage node that has a high bandwidth network connection (e.g., current bandwidth, historical bandwidth, average bandwidth over time, etc.) to the client device, a low-latency network connection to the client device, a low network traffic connection to the client device, multiple alternate network paths between it and the client device, and/or the like may be assigned a high rank; and a unique identifier for a storage node that has a shorter network "distance" between it and the client device (based on the IP addresses or MAC addresses of the client device and the storage node), a storage node that has an IP address within a predefined range, a storage node with a particular MAC address, and/or the like may be assigned a higher rank than another unique identifier for a different storage node.

In one embodiment, one or more characteristics of the data item may be used to determine the ranks for the unique identifiers. For example, certain storage nodes may be optimized or configured to store certain data types, such as videos, music files, photos, text files, metadata, source code, libraries, data blocks, data objects, raw data, and/or the like. Thus, a unique identifier associated with a storage node that is specially configured to store video files may be assigned the highest rank if the received data item is a video file. Other characteristics of the data item that the rank module 204 may consider when assigning ranks to unique identifiers includes a size of the data item, an author of the data item, the creation date of the data item, and/or the like. In some embodiments, the rank module 204 uses a combination of one or more characteristics of the data item, one or more network characteristics, one or more cluster characteristics, and/or the like, to determine a rank value for each unique identifier.

In one embodiment, the received data item is associated with an application executing on a client device connected to the storage cluster. In certain embodiments, the client device that the application is executing on is also a storage node of the storage cluster. In such an embodiment, a unique identifier associated with the client device executing the application is assigned the best ranking such that the received data item from the application is stored on the client device. In such an embodiment, placing the data item on the same storage node as the application that created the data item may be the most efficient way to access the data item without sending data over a data network 106.

In one embodiment, the storage module 206 is configured to select a unique identifier of the plurality of unique identifiers with the best or the highest ranking. The storage module 206 may store the data item on a storage node associated with the unique identifier that has the highest ranking. In one embodiment, the storage module 206 creates a name for the data item, at least a portion of which includes a character string, number, hash value, etc., referring to the unique identifier when the received data item is stored on the storage node. For example, the storage module 206 may give the data item a name such as "data_GUID2.txt," or the like, for a unique identifier represented by the character string "GUID2." In certain embodiments, the storage module 206 uses the entire character string, number, hash value, or the like representing the unique identifier in the name assigned to the data item to guarantee that each data item is assigned a unique name.

In one embodiment, after the storage module 206 selects and uses a unique identifier, the identifier module 202 generates a new unique identifier and adds the newly generated unique identifier to the pool of unique identifiers. For example, after the storage module 206 selects a unique identifier "GUID123" from the pool of unique identifiers, and stores a data item on the storage node associated with the unique identifier "GUID123," the identifier module 202 may be triggered to create a new unique identifier "GUID5768", and randomly assign the new unique identifier "GUID5768" to a storage node, which may be the same storage node or a different storage node than the storage node that was assigned to the selected unique identifier "GUID123." The identifier module 202 may continue to create new unique identifiers in response to the storage module 206 using existing unique identifiers indefinitely or until a threshold or total number of unique identifiers has been created. In this manner, the identifier module 202 may maintain a desired pool size of unique identifiers and may further the random or pseudo-random nature of data placement within the storage cluster.

The apparatus 200 may optionally include a network module 208 that determines one or more network characteristics associated with a client device and one or more storage nodes of the storage cluster. In certain embodiments, the rank module 204, as described above, ranks each of the plurality of unique identifiers based on the one or more network characteristics.

In certain embodiments, the network module 208 determines, generates, creates, discovers, and/or the like a network topology and/or a network map of the storage cluster. The network map may include each device, e.g., servers 108, routers, switches, access points, bridges, hubs, etc., in the storage cluster, and the network links that connect the devices. Furthermore, the network module 208 may determine one or more characteristics of each device in the storage cluster, such as various hardware specifications of each device, a type of connection the device is using to connect to the storage cluster (e.g., wired or wireless), an upload/download data transfer speed for the device, and/or the like. The network module 208 may monitor network traffic, bandwidth, latency, and/or the like between various devices in the storage cluster.

In one embodiment, the one or more network characteristics include one or more of a number of intermediate network devices between the client device and a storage node, a network distance between the client device and a storage node, a physical location of the client device and a physical location of a storage node, an amount of network traffic between the client device and a storage node, an amount of network latency between the client device and a storage node, a number of alternate network paths between the client device and a storage node, an IP address of the client device and an IP address of a storage node, a MAC address of the client device and the MAC address of a storage node, and/or the like. In this manner, the storage management module 104 may place data in a storage cluster in a manner that allows the data to be placed within a close proximity of the application or client device that uses the data, while also maintaining the random and balanced placement of data in the storage cluster in the long term.

Figure 3:
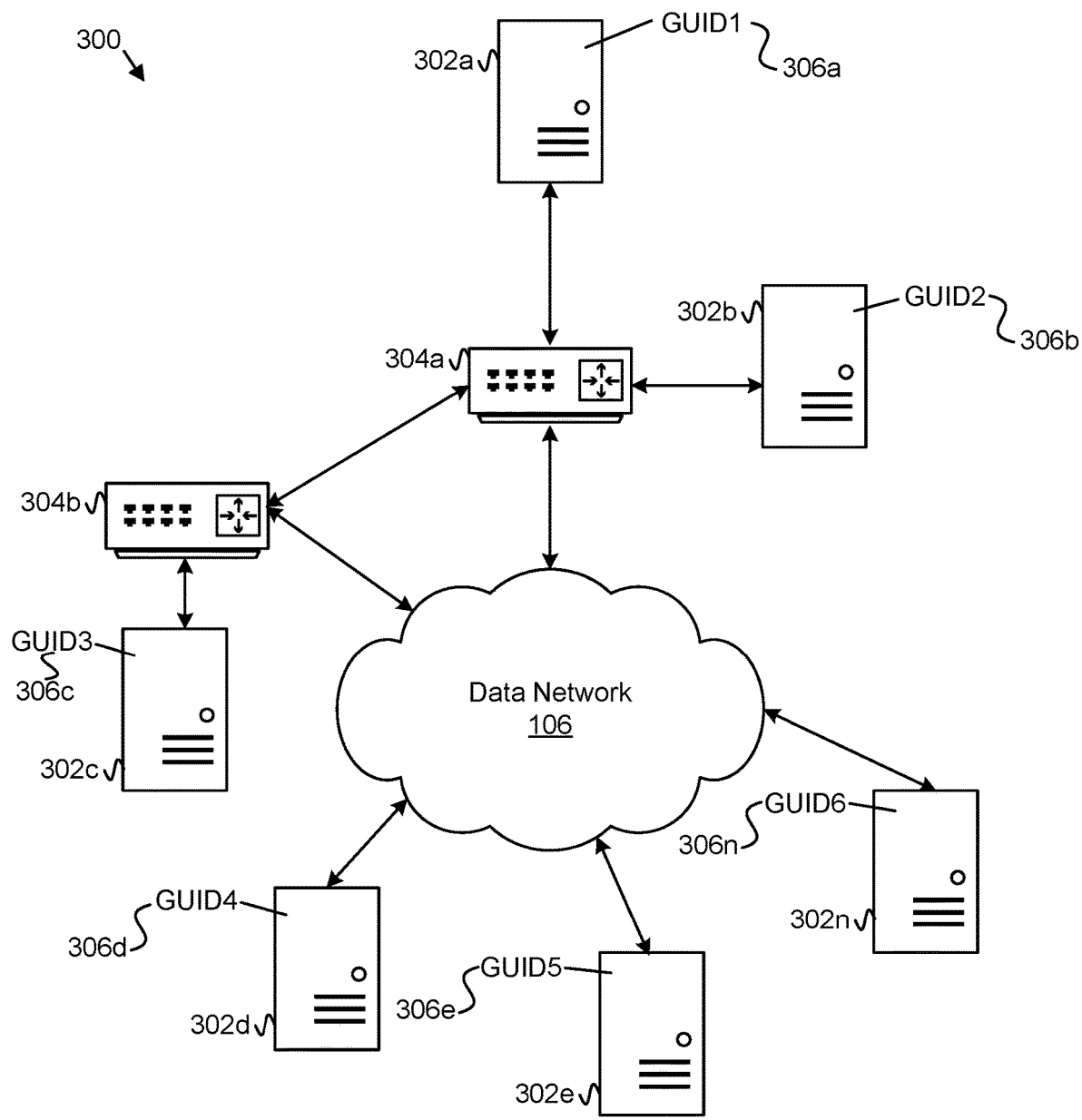
FIG. 3 is a schematic block diagram illustrating one embodiment of another system for improved storage performance based on data placement.

FIG. 3 depicts one embodiment of a system 300 for improved storage performance based on data placement. In one embodiment, the system 300 is a storage cluster that includes one or more storage nodes 302a-n, one or more network devices 304a-b, one or more unique identifiers 306a-n, and a data network 106. In one embodiment, the network module 208 determines one or more characteristics of the storage cluster, such as the number of storage nodes 302a-n and other devices 304a-b in the cluster, the types of links between the storage nodes 302a-n and other devices 304a-b in the cluster, the physical locations of the storage nodes 302a-n and other devices 304a-b in the cluster, the network bandwidth/latency/traffic/capacity between storage nodes 302a-n and other devices 304a-b in the cluster, the IP addresses and/or MAC address of the storage nodes 302a-n and other devices 304a-b in the cluster, and/or the like.

In one embodiment, an identifier module 202 generates a plurality of unique identifiers 306a-n and assigns each of the unique identifiers 306a-n to a storage node 302a-n. Even though only six unique identifiers 306a-n are depicted in FIG. 3, the identifier module 202 may generate many more unique identifiers 306a-n according to a predetermined algorithm based on the number of storage nodes 302a-n in the cluster, based on a desired data placement pattern, and/or the like.

In some embodiments, the rank module 204 assigns a rank to each of the unique identifiers 306a-n that indicates a favorability for placement on a storage node for a data item. In one embodiment, the ranking may be based on one or more characteristics of the data item. For example, if the data item is a video created by an application executing on a client device 302a (which may also be a storage node 302a-n in the storage cluster), and a particular storage node 302d in the storage cluster is configured to store video files, the rank module 204 may assign the unique identifier 306d associated with the storage node 302d configured to store video files with the highest rank. Accordingly, the storage module 206, in one embodiment, selects the unique identifier 306d associated with the storage node 302d configured to store video files because it has the highest rank, and stores the video on the storage node 302d.

In some embodiments, the rank module 204 assigns a rank to each of the unique identifiers 306a-n based on one or more network characteristics of the storage cluster, as determined by the network module 208. For example, if an application executing on a client device 302a creates a data item to store in the storage cluster, the rank module 204 may determine the "best" placement for the data item in the storage cluster. The rank module 204 may determine, for example, whether a unique identifier 306a is available for the storage node 302a that is configured as the client device 302a, and may assign the highest rank to the unique identifier 306a if available, so that the storage module 206 may store the data item locally with the application using the data item.

In another example embodiment, the rank module 204 may determine that the network latency between a client device 302a and a first storage node 302b is greater than the network latency between the client device 302a and a second storage node 302c. Accordingly, the rank module 204 may assign a higher rank to the unique identifier 306c associated with the second storage node 302c even though the first storage node 302b is "closer" to the client device 302a because there is only one router 304a between the client device 302a and the first storage node 302b and there are two routers 304a-b between the client device 302a and the second storage node 302c. Accordingly, the storage module 206 may select the unique identifier 306c for the second storage node 302c and store the data item on the second storage node 302c.

In another example embodiment, the rank module 204 may determine that a first storage node 302e is physically located in a different location than the client device 302a, such as in a remote data center, and a second storage node 302b is physically located on the same premises as the client device 302a. Accordingly, the rank module 204 may assign a higher rank to the unique identifier 306b associated with the second storage node 302b because the second storage node 302b is physically co-located with the client device 302a and may have a faster network connection to the client device 302a than the first storage node 302e.

In other example embodiments, the rank module 204 may assign a higher rank to a unique identifier 306a-n associated with a first storage node 302b-n in response to determining that a bandwidth between a client device 302a and the first storage node 302b-n is higher, on average, than between the client device 302a and a different storage node 302b-n. In another example, the rank module 204 may assign a higher rank to a unique identifier 306a-n associated with a first storage node 302b-n in response to determining that there are more alternate network links/paths between the client device 302a and a first storage node 302b-n than between the client device 302a and a different storage node 302b-n. In another example, the rank module 204 may assign a higher rank to a unique identifier 306a-n associated with a storage node 302a-n that has an IP address within the same IP address range as the client device 302a. In yet another example, the rank module 204 may assign a higher rank to a unique identifier 306a-n associated with a storage node 302a-n that has a particular MAC address.

The above example embodiments in relation to FIG. 3 assume that unique identifiers 306a-n are available for each of the storage nodes 302a-n in the storage cluster. As described above, the identifier module 202 randomly assigns each of the unique identifiers 306a-n to a storage node 302a-n. Thus, it is possible that a unique identifier 306a-n may not be assigned to a particular storage node 302a-n until one is generated by the identifier module 202 and assigned to a storage node 302a-n. For example, even though a storage node 302b may be the most appropriate storage node 302a-n for a data item, if a unique identifier 306a-n is not assigned to the storage node 302b, then the storage node 302b may not be available for storing the data item. In this manner, the storage management module 104 may preserve existing randomization algorithms for placing data items on storage nodes 302a-n in a storage cluster, while providing, on average, better data placement in the storage cluster by accounting for network characteristics of the storage cluster.

Figure 4:
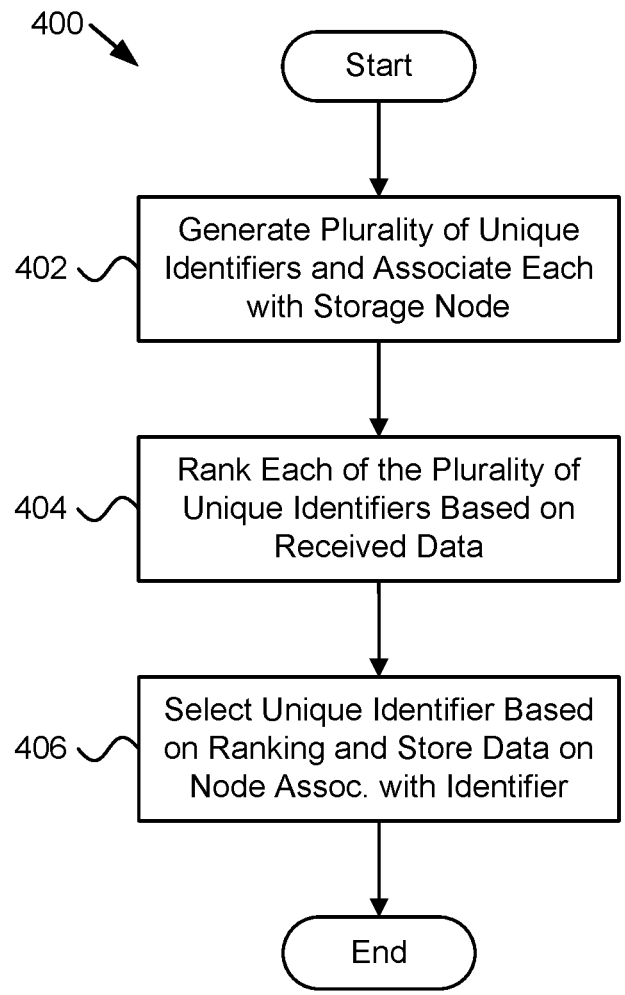
FIG. 4 is a schematic flow chart diagram illustrating one embodiment of a method for improved storage performance based on data placement.

FIG. 4 depicts one embodiment of a method 400 for improved storage performance based on data placement. In one embodiment, the method 400 begins and generates 402 a plurality of unique identifiers that are each associated with a storage node of a storage cluster. In some embodiments, an identifier module 202 generates 402 the plurality of unique identifiers and associates each unique identifier with a storage node.

In a further embodiment, the method 400 ranks 404 each of the plurality of unique identifiers in response to a received data item. In some embodiments, the method 400 ranks 404 a unique identifier based on one or more characteristics associated with the received data item. In certain embodiments, a rank module 204 ranks 404 each of the plurality of unique identifiers in response to a received data item.

In one embodiment, the method 400 selects 406 a unique identifier of the plurality of unique identifiers with a best ranking and stores the data item on a storage node associated with the selected unique identifier, and the method 400 ends. In some embodiments, a storage module 206 selects 406 a unique identifier of the plurality of unique identifiers with a best ranking and stores the data item on a storage node associated with the selected unique identifier.

Figure 5:
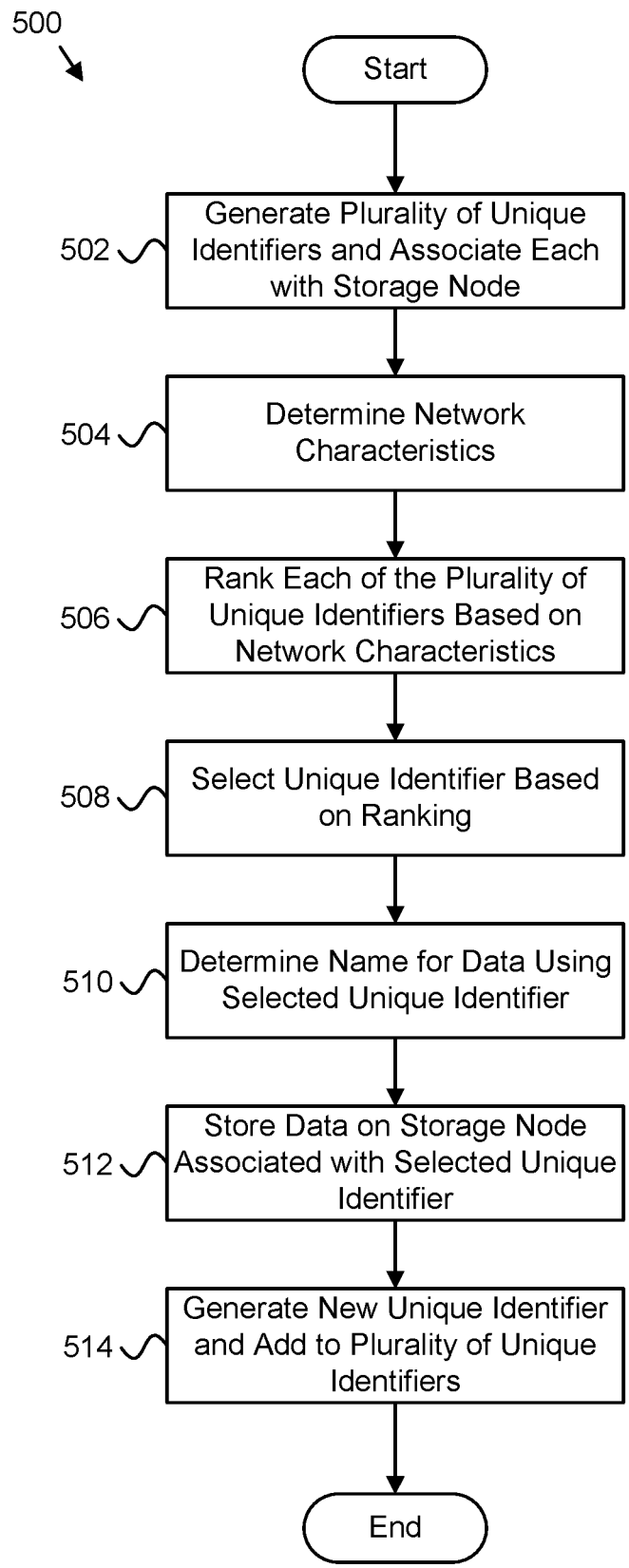
FIG. 5 is a schematic flow chart diagram illustrating one embodiment of another method for improved storage performance based on data placement.

FIG. 5 depicts one embodiment of a method 500 for improved storage performance based on data placement. In one embodiment, the method 500 begins and generates 502 a plurality of unique identifiers that are each associated with a storage node of a storage cluster. In some embodiments, an identifier module 202 generates 502 the plurality of unique identifiers and associates each unique identifier with a storage node.

In one embodiment, the method 500 determines 504 one or more network characteristics associated with a client device that generated the data item and the storage cluster. In certain embodiments, a network module 208 determines 504 one or more network characteristics associated with a client device that generated the data item and the storage cluster. In a further embodiment, the method 500 ranks 506 each of the plurality of unique identifiers based on the one or more network characteristics. In some embodiments, the rank module 204 ranks 506 each of the plurality of unique identifiers based on the one or more network characteristics.

In some embodiments, the method 500 selects 508 a unique identifier of the plurality of unique identifiers with a best ranking. In some embodiments, a storage module 206 selects 508 a unique identifier of the plurality of unique identifiers with a best ranking. In a further embodiment, the method 500 determines 510 a name for the data item, at least a portion of which includes a character string, number, hash value, and/or the like referring to the unique identifier. In one embodiment, the storage module 206 determines 510 a name for the data item.

In one embodiment, the method 500 stores 512 the data item on a storage node associated with the selected unique identifier. In certain embodiments, the storage module 206 stores 512 the data item on a storage node associated with the selected unique identifier. In a further embodiment, the method 500 generates 514 a new unique identifier and adds it to the plurality of unique identifiers after the method 500 selects and uses the selected unique identifier, and the method 500 ends. In one embodiment, the identifier module 202 generates 514 a new unique identifier and adds it to the plurality of unique identifiers after the storage module 206 selects and uses the selected unique identifier.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    an identifier module that generates a plurality of unique identifiers assigned to a plurality of locations distributed across a plurality of storage nodes of a storage cluster, wherein the identifier module generates the plurality of unique identifiers assigned to the plurality of locations distributed across the plurality of storage nodes of the storage cluster at system startup before any data items are stored in the storage cluster;
    a rank module that, prior to a received data item being stored to the storage cluster, determines a storage performance ranking for each of the plurality of unique identifiers assigned to the plurality of locations distributed across the plurality of storage nodes in the storage cluster, the storage performance ranking based on one or more characteristics affecting storage performance of the storage cluster when storing the received data item; and
    a storage module that selects a unique identifier of the plurality of unique identifiers with a best storage performance ranking and stores the data item on the storage node having the location to which the selected unique identifier is assigned,
    wherein said modules comprise one or more of hardware circuits, a programmable hardware device and a processor executing code.

2. The apparatus of claim 1, wherein a size of a pool of unique identifiers that are generated is based on one or more of a number of storage nodes in the storage cluster and a data placement pattern for the storage cluster.

3. The apparatus of claim 1, wherein a new unique identifier is generated and added to the plurality of unique identifiers after the selected unique identifier is used.

4. The apparatus of claim 1, wherein a character string representing the selected unique identifier is used as at least a portion of a name assigned to the received data item when the received data item is stored on the storage node.

5. The apparatus of claim 1, wherein the received data item is associated with an application executing on a client device connected to the storage cluster, the client device comprising a storage node of the storage cluster.

6. The apparatus of claim 5, wherein a unique identifier associated with the client device executing the application is assigned the best ranking such that the received data item is stored on the client device.

7. The apparatus of claim 5, further comprising a network module that determines one or more network characteristics associated with the client device and one or more storage nodes of the storage cluster, wherein the one or more network characteristics affect the storage performance of the storage cluster when storing the received data item.

8. The apparatus of claim 7, wherein the one or more network characteristics comprises one or more of:
   a number of intermediate network devices between the client device and a storage node;
   a network distance between the client device and a storage node;
   a physical location of the client device and a physical location of a storage node;
   an amount of network traffic between the client device and a storage node;
   an amount of network latency between the client device and a storage node;
   a number of alternate network paths between the client device and a storage node;
   IP addresses of the client device and a storage node; and
   MAC addresses of the client device and a storage node.

9. The apparatus of claim 1, wherein the storage node is one of a plurality of virtual storage nodes of the storage cluster such that one or more of the plurality of unique identifiers is associated with a virtual storage node.

10. The apparatus of claim 9, wherein each of the plurality of unique identifiers associated with a virtual storage node maintains its association to a virtual storage node when a virtual storage node is migrated to a different physical device.

11. A method comprising:
   generating, by use of a processor, a plurality of unique identifiers assigned to a plurality of locations distributed across a plurality of storage nodes of a storage cluster, wherein generating the plurality of unique identifiers comprises generating the plurality of unique identifiers assigned to the plurality of locations distributed across the plurality of storage nodes of the storage cluster at system startup before any data items are stored in the storage cluster;
   determining, prior to a received data item being stored to the storage cluster, a storage performance ranking for each of the plurality of unique identifiers assigned to the plurality of locations distributed across the plurality of storage nodes of the storage cluster, the storage performance ranking based on one or more characteristics affecting storage performance of the storage cluster when storing the received data item; and
   selecting a unique identifier of the plurality of unique identifiers with a best ranking and storing the data item on the storage node having the location to which the selected unique identifier is assigned.

12. The method of claim 11, wherein a size of a pool of unique identifiers that are generated is based on one or more of a number of storage nodes in the storage cluster and a data placement pattern for the storage cluster.

13. The method of claim 11, wherein a character string representing the selected unique identifier is used as at least a portion of a name assigned to the received data item when the received data item is stored on the storage node.

14. The method of claim 11, wherein the received data item is associated with an application executing on a client device connected to the storage cluster, the client device comprising a storage node of the storage cluster.

15. The method of claim 14, wherein a unique identifier associated with the client device executing the application associated with the received data item is assigned the best ranking such that the received data item is stored on the client device.

16. The method of claim 14, further comprising determining one or more network characteristics associated with the client device and one or more characteristics of the storage cluster, wherein the one or more network characteristics affect the storage performance of the storage cluster when storing the received data item.

17. The method of claim 11, wherein the storage node is one of a plurality of virtual storage nodes of the storage cluster such that one or more of the plurality of unique identifiers is associated with a virtual storage node.

18. A non-transitory computer readable storage medium that stores code executable by a processor, the executable code comprising code to perform:
   generating a plurality of unique identifiers assigned to a plurality of locations distributed across a plurality of storage nodes of a storage cluster, wherein generating the plurality of unique identifiers comprises generating the plurality of unique identifiers assigned to the plurality of locations distributed across the plurality of storage nodes of the storage cluster at system startup before any data items are stored in the storage cluster;
   determining, prior to a received data item being stored to the storage cluster, a storage performance ranking for each of the plurality of unique identifiers assigned to the plurality of locations distributed across the plurality of storage nodes in the storage cluster, the storage performance ranking based on one or more characteristics affecting storage performance of the storage cluster when storing the received data item; and
   selecting a unique identifier of the plurality of unique identifiers with a best ranking and storing the data item on the storage node having the location to which the selected unique identifier is assigned.

19. The apparatus of claim 1, wherein the identifier module generates the plurality of unique identifiers using one of a load balancing algorithm and a capacity balancing algorithm.

20. The method of claim 11, wherein generating the plurality of unique identifiers comprises generating the plurality of unique identifiers using one of a load balancing algorithm and a capacity balancing algorithm.

* * * * *